United States Patent
Smith et al.

(10) Patent No.: US 8,251,305 B2
(45) Date of Patent: Aug. 28, 2012

(54) ROTORCRAFT WITH VARIABLE INCIDENT WING

(75) Inventors: Dudley E. Smith, Arlington, TX (US); Walter C. Joiner, Arlington, TX (US); Daniel B. Robertson, Southlake, TX (US); David J. Ludolph, Arlington, TX (US); Jennifer D. Langston, Coppell, TX (US)

(73) Assignee: Textron Innovations Inc., Providence, RI (US)

( * ) Notice: Subject to any disclaimer, the term of this patent is extended or adjusted under 35 U.S.C. 154(b) by 53 days.

(21) Appl. No.: 12/866,904

(22) PCT Filed: Feb. 11, 2009

(86) PCT No.: PCT/US2009/033716
§ 371 (c)(1), (2), (4) Date: Aug. 10, 2010

(87) PCT Pub. No.: WO2009/102739
PCT Pub. Date: Aug. 20, 2009

(65) Prior Publication Data
US 2010/0327123 A1    Dec. 30, 2010

Related U.S. Application Data

(60) Provisional application No. 61/028,212, filed on Feb. 13, 2008.

(51) Int. Cl.
*B64C 27/28* (2006.01)
(52) U.S. Cl. ..................................... 244/7 C
(58) Field of Classification Search .............. 224/6, 7 R, 224/7 C, 48, 56, 66, 17.11
See application file for complete search history.

(56) References Cited

U.S. PATENT DOCUMENTS

| | | | | |
|---|---|---|---|---|
| 2,389,798 A | * | 11/1945 | Main | 416/115 |
| 2,814,451 A | * | 11/1957 | Turner et al. | 244/7 R |
| 3,185,408 A | * | 5/1965 | Higgins | 244/7 R |
| 3,389,878 A | * | 6/1968 | Westrup | 244/12.1 |
| 3,514,052 A | * | 5/1970 | McKeown | 244/12.3 |
| 3,563,496 A | | 2/1971 | Zuck | |
| 3,666,209 A | * | 5/1972 | Taylor | 244/7 C |
| 4,142,697 A | * | 3/1979 | Fradenburgh | 244/7 R |
| 4,691,878 A | | 9/1987 | Vaughan et al. | |
| 5,085,315 A | | 2/1992 | Sambell | |
| 5,096,140 A | | 3/1992 | Dornier et al. | |
| 6,260,793 B1 | * | 7/2001 | Balayn et al. | 244/7 R |
| 6,367,736 B1 | * | 4/2002 | Pancotti | 244/7 R |
| 6,607,161 B1 | | 8/2003 | Krysinski et al. | |
| 6,974,105 B2 | | 12/2005 | Pham | |
| 7,143,973 B2 | * | 12/2006 | Ballew | 244/6 |

* cited by examiner

*Primary Examiner* — Tien Dinh
(74) *Attorney, Agent, or Firm* — James E. Walton; Jeffrey O. Williams

(57) ABSTRACT

A twin-rotor side-by-side compound rotorcraft has a fuselage and variable incident wing assembly that pivots relative to fuselage. The aircraft also has landing gear assembly and a tail fin assembly. The variable incident wing assembly is pivotally attached to the fuselage, and includes wing members, engines fixedly mounted to the wing members or another area of the rotorcraft, and a mast attached at a fixed angle relative to the wing members. Then engines may also be located near the fuselage or another area of the rotorcraft. The variable incident wing assembly is capable of pivoting about a pivot axis, thereby allowing mast orientation in at least a hover mast position and a forward flight mast position. The rotors provide additional forward thrust and the wings provide additional lift, when the mast is in the forward flight mast position.

8 Claims, 5 Drawing Sheets

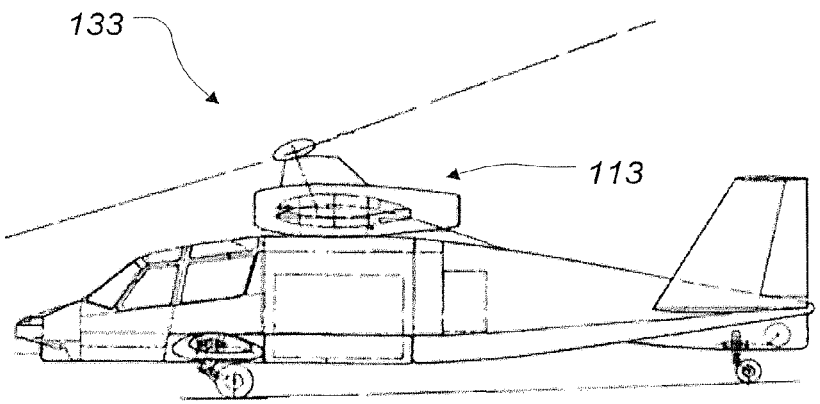
FIG. 5
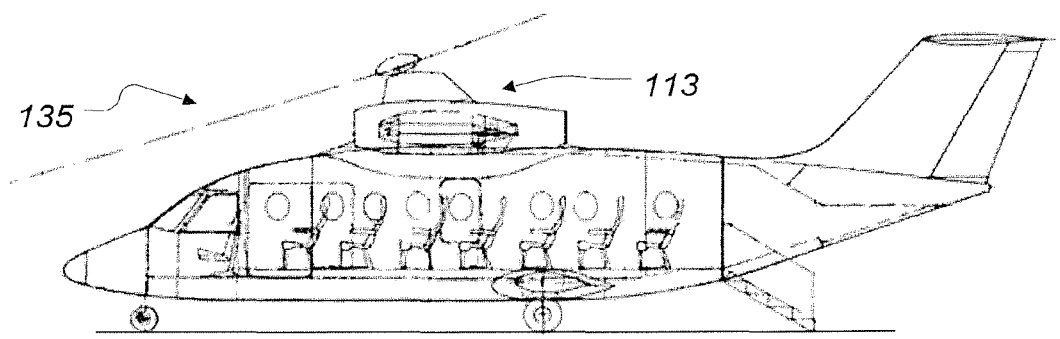
FIG. 6
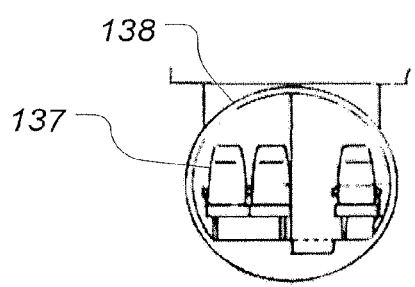 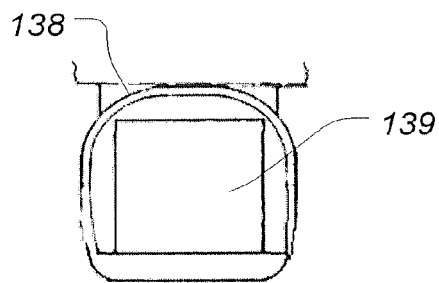
FIG. 7   FIG. 8

ROTORCRAFT WITH VARIABLE INCIDENT WING

TECHNICAL FIELD

The present invention relates to helicopters and other rotorcraft.

DESCRIPTION OF THE PRIOR ART

In simple terms, conventional helicopters have a fuselage, a main rotor, and a tail rotor. Each rotor has multiple rotor blades and is powered by an engine. Power generated by the engine is transmitted to the rotors via shafts, transmissions, and gear boxes. The main rotor is coupled to the engine via a rotor mast.

It is often desirable to have a mast with a variable angle of incidence relative to the fuselage to provide more forward thrust. There are various ways of obtaining variable mast incidence on conventional helicopters, including: (1) utilizing a tilting of the mast/transmission assembly realtive to the fuselage and engine; or (2) utilizing a tilting mast/transmission/engine assembly. Both of these options have significant disadvantages. For example, with the former, a flexible drive shaft is required; and with the latter, a complicated mounting system is required.

In addition, when the main rotor is used to provide increased forward thrust, it is often necessary to provide lift augmentation. This is often achieved by utilizing separate wings that provide lift only. Typically, helicopters with lift-augmentation wings require ancillary propulsive force from an independent device. Such helicopters are most often identified as compound helicopters.

Although great strides have been made in the area of helicopters having lift augmentation, considerable shortcomings remain.

BRIEF DESCRIPTION OF THE DRAWINGS

The novel features believed characteristic of the invention are set forth in the description. However, the invention itself, as well as, a preferred mode of use, and further objectives and advantages thereof, will best be understood by reference to the following detailed description when read in conjunction with the accompanying drawings, wherein:

FIG. 5 is a side view of a rotorcraft having a variable incident wing system according to the present application, the rotorcraft being represented as a "military gunship" rotorcraft;

FIG. 6 is a side view of a rotorcraft having a variable incident wing system according to the present application, the rotorcraft being represented as a "commercial transport" rotorcraft;

FIG. 7 is a longitudinal cross-sectional view of the fuselage of the rotorcraft of FIG. 6, the rotorcraft having a "passenger" configuration;

FIG. 8 is a longitudinal cross-sectional view of the fuselage of the rotorcraft of FIG. 6, the rotorcraft having a "cargo" configuration;

Figure 1A:
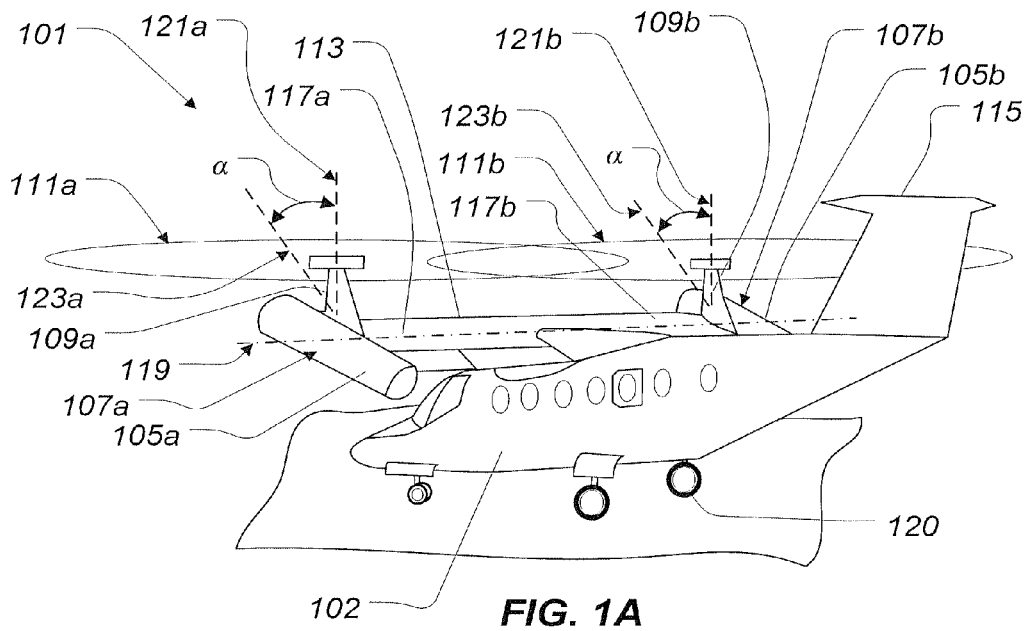
FIG. 1A is an oblique view of a rotorcraft having a variable incident wing system according to the present application, the rotorcraft being shown on the ground in a "hover" mode.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as described herein.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The invention of the present application relates primarily to high-speed helicopter/rotorcraft configuration concepts. The rotorcraft according to the present application provides a unique solution to the high-speed problems of retreating blade stall and rotor flapping speed limitations common in edgewise, i.e., helicopter, rotor systems.

Figure 1B:
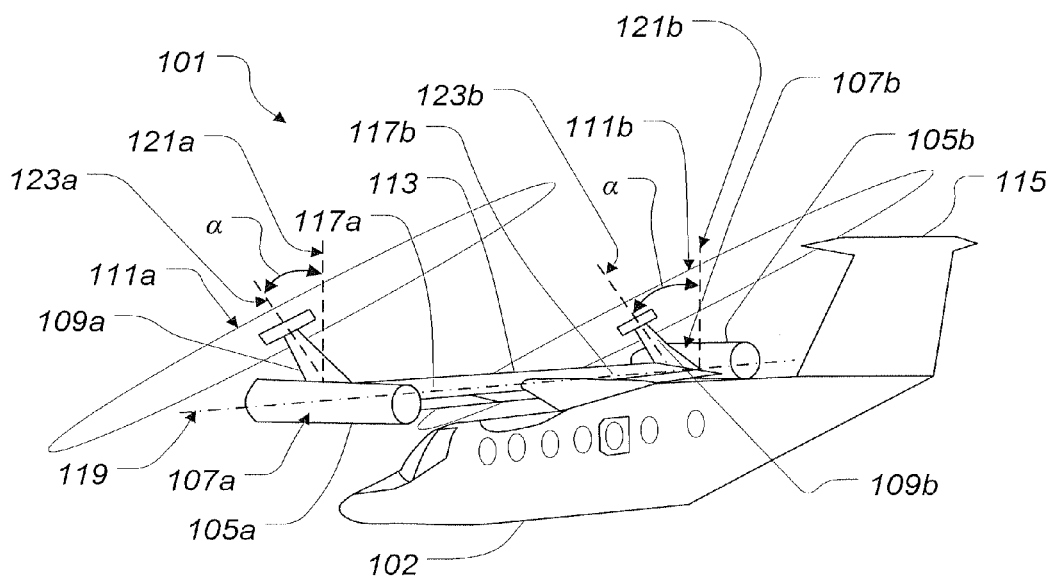
FIG. 1B is an oblique view of the rotorcraft of FIG. 1A, the rotorcraft being shown in flight in a "forward flight" mode.

Referring to FIGS. 1A and 1B in the drawings, the preferred embodiment of a rotorcraft 101 having a variable incident wing system 113 according to the present application is illustrated. In the preferred embodiment, rotorcraft 101 is a twin-rotor side-by-side compound rotorcraft with a fuselage 102 and variable incident wing assembly 113 that pivots relative to fuselage 102. Fuselage 102 includes a cabin, a passenger/cargo portion, and a tail boom. Rotorcraft 101 includes a suitable landing gear assembly 120 and a tail fin assembly 115. Tail fin assembly 115 is coupled to the tail boom portion of fuselage 102, and may include a rudder, a butterfly tail assembly, or other suitable vertical and horizontal stabilizers.

Variable incident wing assembly 113 includes wing members 117a and 117b, engines 105a and 105b, transmissions 107a and 107b, masts 109a and 109b, and a pair of counter-rotating rotors 111a and 111b that are rotatably coupled to masts 109*a* and 109*b*, respectively. In the preferred embodiment engines 105*a* and 105*b*, transmissions 107*a* and 107*b*, and masts 109*a* and 109*b* are fixed relative to wing members 117*a* and 117*b*, respectively. The lift-propulsive system is formed by the placement of counter-rotating rotors 111*a* and 111*b* mounted at or very near the tips of wing members 117*a* and 177*b*. Rotors 111*a* and 111*b* are mounted to masts 109*a* and 109*b*, respectively, which are mounted in transmissions 107*a* and 107*b*, respectively, at each of those locations. The static orientation of masts 109*a* and 109*b* are such that masts 109*a* and 109*b* are tilted forward, i.e., in the direction of forward flight, at a fixed angle with respect to the chord of wing members 117*a* and 117*b* when the wing chord is aligned with the direction of flight. Engines 105*a* and 105*b* are mounted at or near those same wing tip locations, and provide the necessary power to rotors 111*a* and 111*b* via transmissions 107*a* and 107*b*, respectively, to produce thrust. Although locations of engines 105*a* and 105*b* are depicted herein are approximate to the wing tips, engines 105*a* and 105*b* may also be located in other areas of rotorcraft 101, such as approximate to fuselage 102. Such variation of engine location is true for each embodiment disclosed herein. Cross-shafting is preferably provided to insure operation of both rotors 111*a* and 111*b* in the event of a possible one engine inoperative (OEI) condition. Thus, rotors 111*a* and 111*b*, engines 105*a* and 105*b*, transmissions 107*a* and 107*b*, cross shafting and any subsystems incorporated within wing members 117*a* and 117*b* are fixed in orientation relative to wing members 117*a* and 117*b*. Wing members 117*a* and 117*b* are mounted to fuselage 102 of rotorcraft 101, such that wing members 117*a* and 117*b* may be rotated relative to fuselage 102. This rotating is about a pivot axis 119, which is perpendicular to the fuselage longitudinal axis, such that rotation of variable wing incident assembly 113 changes the wing incidence, and thus, tilts masts 109*a* and 109*b*, thereby providing variable mast tilt.

In FIG. 1A, rotorcraft 101 is shown sitting on the ground in a "hover" mode. In FIG. 1B, rotorcraft 101 is shown in flight in a "forward flight" mode. In the hover mode, masts 109*a* and 109*b* are positioned in a hover mast position 121*a*, 121*b*, which is a generally vertical orientation, such that the rotor planes defined by rotors 111*a* and 111*b* are generally horizontal. The angles of masts 109*a* and 109*b* may be changed by selectively varying the incidence angle of variable incident wing assembly 113. In the forward flight mode, variable incident wing assembly 113 is pivoted forward relative to fuselage 102, thereby causing masts 109*a* and 109*b* to tilt forward to a forward flight mast position 123*a*, 123*b*. In the preferred embodiment, the angle α, between hover mast position 121*a*, 121*b* and forward flight mast position 123*a*, 123*b* is approximately 25 degrees. When in forward flight mast position 123*a*, 123*b*, the forward tips of the rotor planes are lower than the aft tips of the rotor planes. This forward tilting of the rotor planes generates a propulsive forward thrust. There are many advantages to this unique configuration. Wing members 117*a* and 117*b* provide ancillary lift, offload the rotor lift, reduce retreating blade stall, and delay sharp power rises. The variable mast tilt provides ancillary propulsive force and orients the rotors to minimize flapping and rotor loads.

Figure 2:
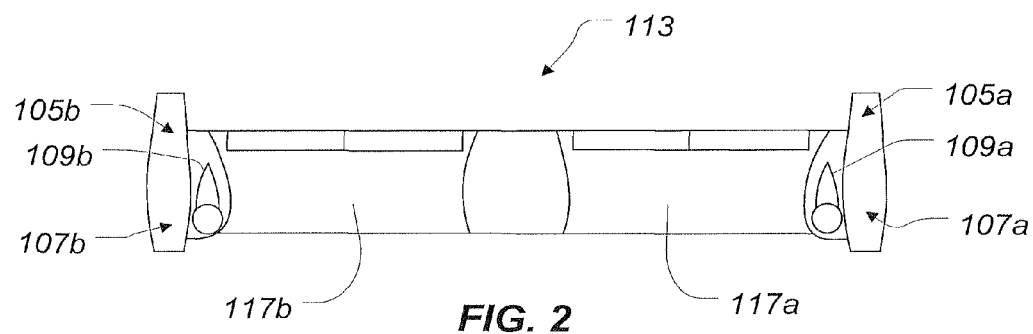
FIG. 2 is a plan view of the variable incident wing system for use on various types of rotorcraft according to the present application.
Figure 3:
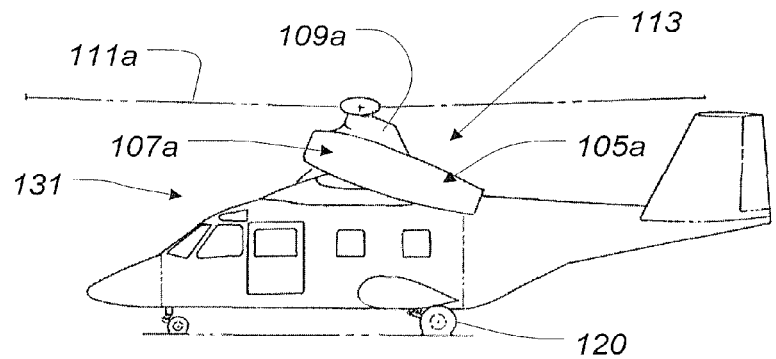
FIG. 3 is a side view of a rotorcraft having a variable incident wing system according to the present application, the rotorcraft being represented as a "troop transport" rotorcraft in the hover mode.
Figure 4:
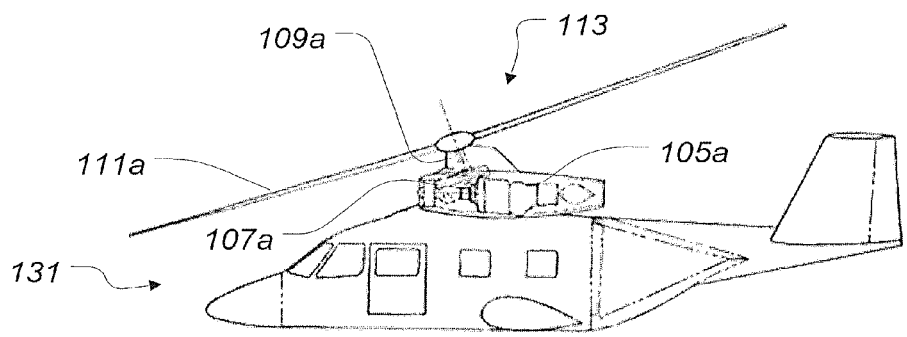
FIG. 4 is a side view of the rotorcraft of FIG. 3, the rotorcraft being shown in the "forward flight" mode.

Referring now also to FIG. 2 in the drawings, a partial plan view of variable incident wing assembly 113 is illustrated. The common lift-propulsion system allows masts 109*a* and 109*b* to be oriented from verticle to a selected angle forward as a function of airspeed, thereby providing: (1) an optimum rotor tip path plane; (2) an additional propulsive force; and (3) lift augmentation.

Referring now also to FIGS. 3-7 in the drawings, one important feature of the present application is that variable incident wing assembly 113 provides a common lift-propulsion system that is scaleable and that can be utilized on a wide variety of rotorcraft designs and applications. For example, in FIGS. 3 and 4, variable incident wing assembly 113 is shown installed on a troop transport type rotorcraft 131. In FIG. 5, variable incident wing assembly 113 is shown installed on a military gunship type rotorcraft 133. In FIG. 6, variable incident wing assembly 113 is shown installed on a commercial transport type rotorcraft 135. FIGS. 7 and 8 illustrate two of the many types of fuselage configurations that may be utilized with the invention of the present application. FIG. 7 is a longitudinal cross-sectional view of rotorcraft 135 having a "passenger" configuration, in which rows of passenger seats 137 are arranged inside a passenger/cargo section 138 of the fuselage; and FIG. 8 is a longitudinal cross-sectional view of rotorcraft 135 having a "cargo" configuration, in which the passenger/cargo section 138 is open to receive cargo 139.

Wing members 117*a* and 117B augment the lift, thereby unloading rotor 111*a* and 111*b*, which allows rotors 111*a* and 111*b* to aerodynamically reach higher speeds prior to the onset of retreating blade stall. In concert with the wing off-load, the variation of mast incidence allows the tip paths of the rotor planes to be oriented in flight to provide additional propulsive force and minimize the flapping of rotors 111*a* and 111*b*. All of these features contribute to significantly higher speed capabilities as compared to conventional helicopters and rotorcraft.

Figure 9:
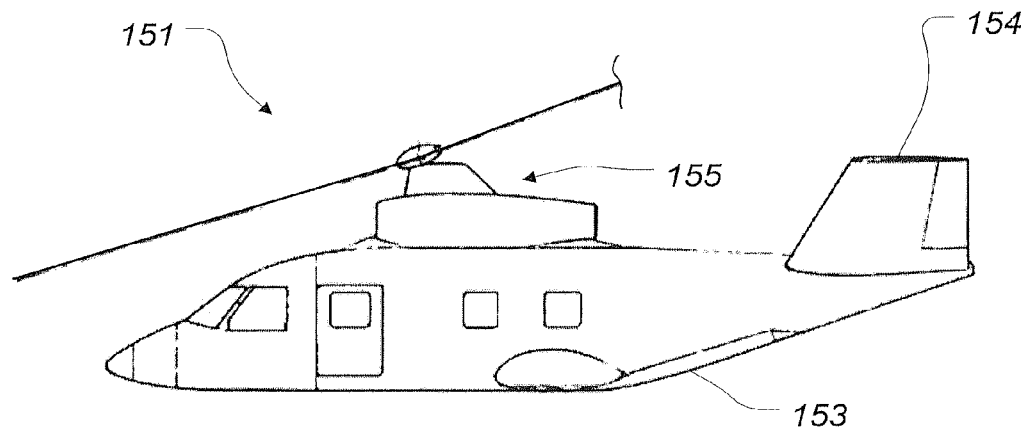
FIG. 9 is a side view of a rotorcraft having a foldable variable incident wing system according to the present application, the foldable variable incident wing system having a "folding wing" configuration shown in an "unfolded" mode.
Figure 10:
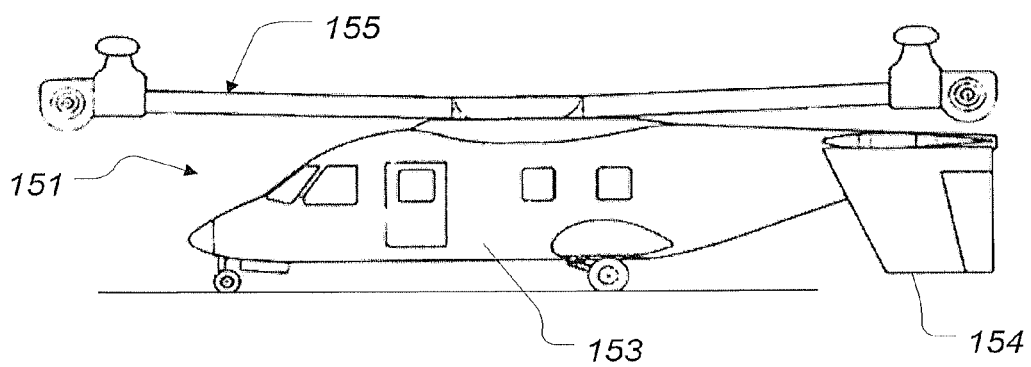
FIG. 10 is a side view of the rotorcraft of FIG. 9 shown in a "folded" mode.

Referring now to FIGS. 9 and 10 in the drawings, a rotorcraft 151 having a fuselage 153, a tail wing assembly 154, and a foldable variable incident wing assembly 155, according to the present application is illustrated. In this embodiment, variable incident wing assembly 155, similar to variable incident wing assembly 113, is adapted to be folded relative to fuselage into a position in which variable incident wing assembly 155 is generally aligned with the longitudinal axis of fuselage 153. As is shown, tail wing assembly may be adapted to fold down out of the way of variable incident wing assembly 155. It will be appreciated that in this embodiment, the rotor blades may also be adapted and configured to be folded into a reduced-space storage position. This allows rotorcraft to be easily stored and transported.

Figure 11:
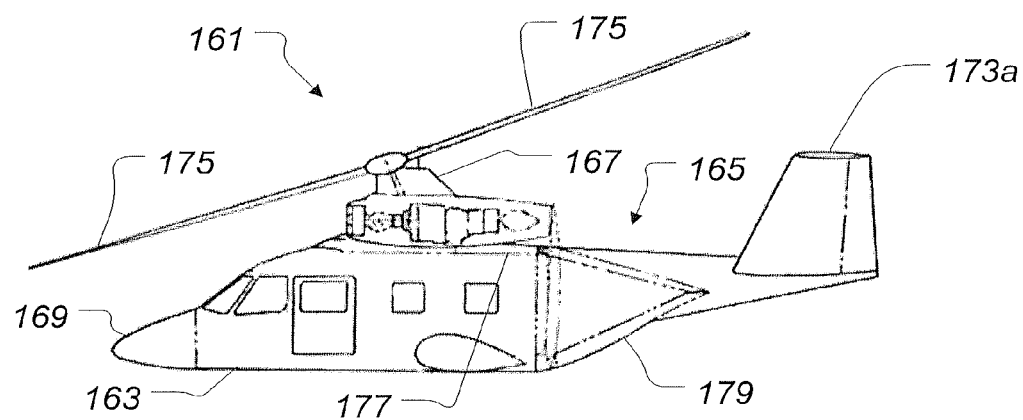
FIG. 11 is a side view of a rotorcraft having a foldable variable incident wing system according to the present application, the foldable variable incident wing system having a "folding fuselage" configuration shown in an "unfolded" mode.
Figure 12:
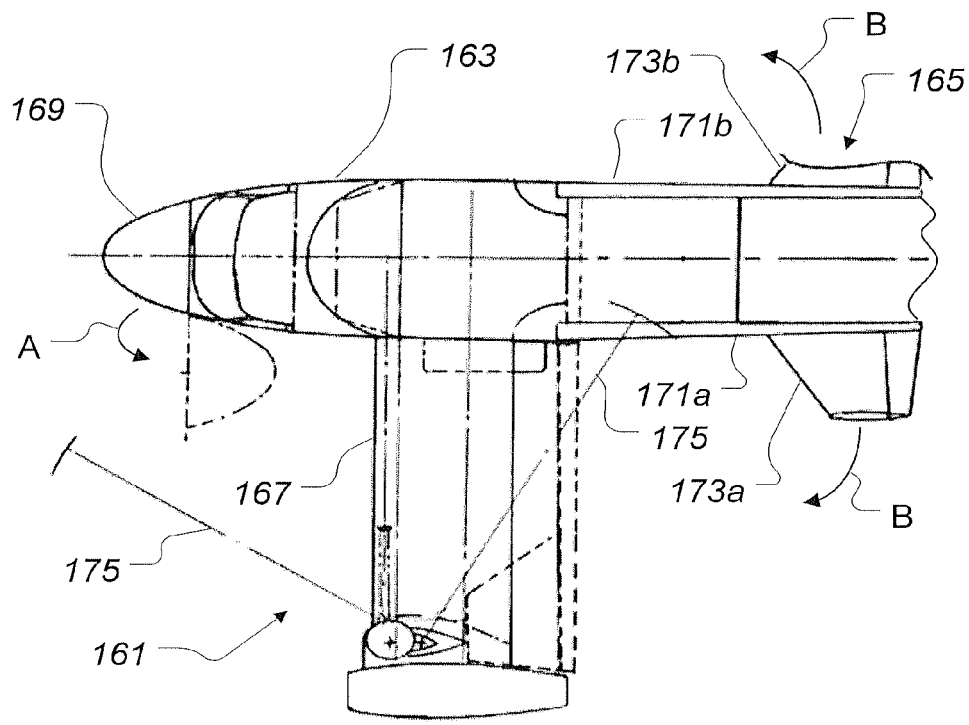
FIG. 12 is a side view of the rotorcraft of FIG. 11 with the "folded" mode represented by dashed lines.

Referring now to FIGS. 11 and 12 in the drawings, a rotorcraft 161 having a foldable fuselage 163, a split tail boom assembly 165, and a variable incident wing assembly 167, according to the present application is illustrated. Variable incident wing assembly 167, similar to variable incident wing assembly 113, is pivotally coupled to foldable fuselage 163. In this embodiment, foldable fuselage 163 has a folding nosecone 169 that pivots and folds rearward in the direction of arrow A, as shown with dashed lines in FIG. 12. In addition, split tail boom 165 is configured to be separated longitudinally, such that the tail sections 171*a* and 171*b* and tail fins 173*a* and 173*b* can be rotated forward in the directions of arrows B, so as to nest with variable incident wing assembly 167, as shown by the dashed lines in FIG. 12. In addition, in the example of FIGS. 11 and 12, a folding aft roof portion 177 of the cabin may be folded in a rearward direction to nest with a folding loading ramp 179. In this example, loading ramp 179 folds upward to mate with the exhaust port of the engine, as shown in FIG. 11. Also, as with the example of FIGS. 9 and 10, rotor blades 175 may also be adapted and configured to be folded into a reduced-space storage position. This allows rotorcraft to be easily stored and transported. It should be understood that a wide variety of additional folding configurations may be utilized, depending upon space requirements and application.

The concepts of the present application are unique in that the invention of the present application represents the first time an integrated system has been defined that can address the problems and limitations associated with high-speed helicopter/rotorcraft flight with a common lift-propulsive system, and represents the first application of a variable incidence wing to a helicopter/rotorcraft to provide the combination of lift augmentation, mast tilt, reduced flapping, and propulsive force to address the high-speed issues.

It is evident by the foregoing description that the invention of the subject application has significant benefits and advantages, in particular: (1) greater hover lift efficiency via elimination of the tail rotor or ducted antitorque system losses; (2) the wing synergistically provides lift augmentation and a mounting system for the rotors, masts, transmissions, engines, etc. that move in unison eliminating the difficulties with conventional variable geometry rotorcraft; and (3) the variation of the wing incidence provides mast tilt capability that reduces rotor flapping and provides propulsive force. Another advantage of the invention of the present application is that because the engines, transmissions, and masts are located in a fixed relation to the wing member, the fuel lines, hydraulic lines, cables, and other conduit do not have to pass through rotating components, such as movable nacelles.

It is apparent that an invention with significant advantages has been described and illustrated. The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present invention is shown in a limited number of forms, it is not limited to just these forms, but is amenable to various changes and modifications without departing from the spirit thereof.

The invention claimed is:

1. An aircraft, comprising:
   a fuselage;
   a landing gear assembly attached to the fuselage;
   a tail fin assembly attached to the fuselage; and
   a variable incident wing assembly pivotally attached to the fuselage by being capable of pivoting about a pivot axis, the variable incident wing assembly comprising:
      wing members pivotally connected to the fuselage, the wing members having a wing chord;
      engines fixedly mounted to the wing members;
      a mast attached to each engine via a transmission, each mast being fixed at an angle relative to the wing chord of the wing members, the mast being fixedly positioned relative the wing members such that when the wing chord is oriented substantially horizontal, the mast is tiltedly positioned forward from vertical at said angle, but when the mast is oriented vertically, the wing chord is rotationally oriented upward by said angle from horizontal; and
      a rotor attached to each mast.

2. The aircraft according to claim 1, wherein said angle is approximately 25 degrees.

3. The aircraft according to claim 1, wherein the aircraft is a troop transport type rotorcraft.

4. The aircraft according to claim 1, wherein the aircraft is a military gunship type rotorcraft.

5. The aircraft according to claim 1, wherein the aircraft is a commercial transport type rotorcraft.

6. The aircraft according to claim 1, wherein the engines are mounted near tips of the wing members.

7. The aircraft according to claim 1, wherein the rotors provide propulsive forward thrust when the mast is in a forward flight mast position.

8. The aircraft according to claim 1, wherein the wing members provide lift augmentation when the mast is in a forward flight mast position.

\* \* \* \* \*